(12) United States Patent
Daniel et al.

(10) Patent No.: US 10,956,540 B2
(45) Date of Patent: Mar. 23, 2021

(54) UNIFIED DIGITAL RIGHTS MANAGEMENT FOR HETEROGENOUS COMPUTING PLATFORMS

(71) Applicant: ADOBE INC., San Jose, CA (US)

(72) Inventors: Aldrin Chella Daniel, Bangalore (IN); Praveen Kumar Vivekananthan, Bangalore (IN)

(73) Assignee: ADOBE INC., San Jose, CA (US)

(*) Notice: Subject to any disclaimer, the term of this patent is extended or adjusted under 35 U.S.C. 154(b) by 280 days.

(21) Appl. No.: 16/130,932

(22) Filed: Sep. 13, 2018

(65) Prior Publication Data
US 2019/0012437 A1    Jan. 10, 2019

Related U.S. Application Data

(63) Continuation of application No. 14/742,524, filed on Jun. 7, 2015, now Pat. No. 10,140,429.

(51) Int. Cl.
*G06F 21/10* (2013.01)
*G06F 21/12* (2013.01)

(52) U.S. Cl.
CPC .............. *G06F 21/10* (2013.01); *G06F 21/12* (2013.01); *G06F 21/121* (2013.01); *G06F 21/125* (2013.01); *G06F 2221/0773* (2013.01)

(58) Field of Classification Search
CPC .. G06F 21/10; G06F 2221/0773; G06F 21/12; G06F 21/121; G06F 21/125
See application file for complete search history.

(56) References Cited

U.S. PATENT DOCUMENTS

| | | | | |
|---|---|---|---|---|
| 2004/0167926 | A1* | 8/2004 | Waxman | G06F 21/6218 |
| 2006/0095382 | A1* | 5/2006 | Mahlbacher | G06F 21/10 |
| | | | | 705/59 |
| 2006/0200413 | A1* | 9/2006 | Kessel | G06Q 30/02 |
| | | | | 705/50 |
| 2006/0212943 | A1* | 9/2006 | Kitazato | H04N 21/8355 |
| | | | | 726/26 |
| 2007/0288386 | A1 | 12/2007 | Adachi et al. | |
| 2009/0086978 | A1* | 4/2009 | McAvoy | G06F 21/10 |
| | | | | 380/279 |
| 2013/0340085 | A1 | 12/2013 | Nadell et al. | |

* cited by examiner

*Primary Examiner* — Ayoub Alata
(74) *Attorney, Agent, or Firm* — Shook, Hardy & Bacon LLP

(57) ABSTRACT

Embodiments of the present invention provide systems, methods, and computer storage media directed to providing unified digital rights management (DRM) across heterogeneous computing platforms. In embodiments, a unified DRM engine executed on a computing platform validates one or more constraints defined by a first content license associated with consumption of encrypted content. In response to successful validation, the unified DRM engine, in some embodiments, utilizes a second content license that is associated with the computing platform to enable a native DRM engine of the computing platform to decrypt the encrypted content. Other embodiments may be described and/or claimed.

20 Claims, 6 Drawing Sheets

UNIFIED DIGITAL RIGHTS MANAGEMENT FOR HETEROGENOUS COMPUTING PLATFORMS

BACKGROUND

Digital rights management (DRM) is a mechanism utilized by content providers to protect content offered by the content provider. In utilizing DRM, the content provider generally specifies a number of restrictions associated with use of the content. These restrictions can be defined in the form of a license that is protected, by DRM software and/or hardware to ensure that the content is used, or consumed, in accordance with these restrictions. As used herein, to consume content refers to any utilization of the content, including playing, viewing, copying, migrating, etc.

Under the current state of the art, the diversity of connected devices has resulted in an array of various DRM solutions. Many of these various DRM solutions are proprietary and provide hardware and/or software protection specific to the respective devices on which the various DRM solutions are implemented. In addition, these DRM solutions are not generally open for use by other non-proprietary DRM solutions. As a result, a content provider that wishes to provide content to these devices would need to manage the various DRM solutions implemented on these devices. Management of the various DRM solutions can be difficult though because the management of the content and/or the workflow can be different from device to device depending on the specific DRM solutions supported by the devices.

The background description provided herein is for the purpose of generally presenting the context of the disclosure. Unless otherwise indicated herein, the materials described in this section are not prior art to the claims in this application and are not admitted to be prior art by inclusion in this section.

SUMMARY

Embodiments of the present invention are directed at a uniform digital rights management (DRM) scheme that enables support for native DRM solutions implemented on various heterogeneous computing platforms. As used herein, heterogeneous computing platforms refer to computing platforms produced by different manufacturers or implementing different hardware and/or software. In particular, in the context of the present disclosure, heterogeneous computing platforms refer to computing platforms that implement different DRM solutions, or engines. These different DRM engines are referred to herein as native DRM engines of these platforms.

In embodiments, the unified DRM solution disclosed herein merges a unified DRM engine with the underlying native DRM engine of a platform. This may be accomplished without any mutual DRM protocol standardization between the unified DRM engine and the native DRM engine. On platforms that do not support the unified DRM engine for consumption of protected content, the unified DRM engine would utilize a first license (also referred to as first content license) associated with the unified DRM engine to protect a second license (also referred to as second content license) associated with the native DRM engine. The native DRM engine can utilize the second license to initialize the native DRM engine for consumption of protected content.

The first license could define constraints in accordance with those defined by the content provider of the protected content, while the second license could define fewer, different, or no constraints at all. As such, the unified DRM engine protects the license for the native DRM engine rather than just protecting the content itself. In embodiments, this first license may be a unified content license, while the second license may be a native content license. The unified content license may be configured to protect the native content licenses for any number of native DRM engines with which the unified content license is to be utilized. Consequently, this solution enables a single unified DRM engine to support native DRM engines of multiple heterogeneous platforms.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
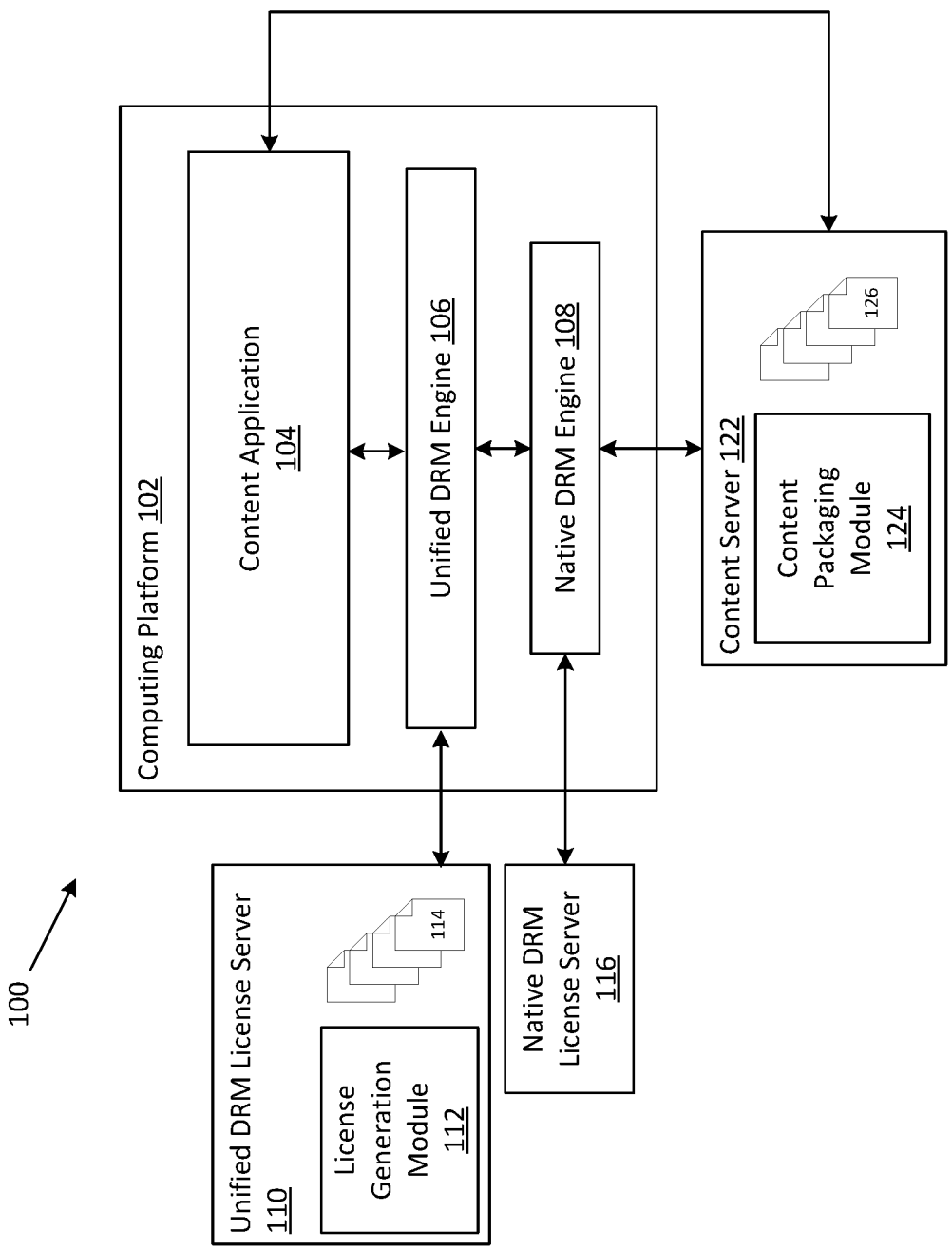
FIG. 1 depicts an illustrative computing environment in which embodiments of the present disclosure may be employed.

Many conventional DRM solutions provide native DRM engines in the form of proprietary hardware and/or software protection specific to the respective devices on which the various native DRM solutions are implemented. In addition, these native DRM solutions are not generally open for use by other non-proprietary DRM solutions. As a result, a content provider that wishes to provide content to these devices would need to manage the various native DRM solutions implemented on these devices. Management of the various native DRM solutions can be difficult though because the management of the content and/or the workflow can be different from device to device depending on the specific DRM solutions supported by the devices.

As an example, consider the SONY® PlayStation 4 (available from Sony Corp. of Tokyo, Japan), and the MICROSOFT® Xbox One (available from Microsoft Corp. of Redmond, Wash.), or the like. Under the current state of the art, the Playstation 4 and the Xbox One would each have a content license that would include constraints with respect to consumption of the digital video content. As such, when a change was needed to the constraints, the change would need to be managed for each of these content licenses. In addition, when wanting to provide the digital video content for a new platform, such as, for example, Nintendo Wii (available from Nintendo Co., Ltd. of Kyoto, Japan), a new content license with similar constraints would be needed. The implementation of constraints may be different from license to license, as such, a content provider would need to manage the implementation of constraints for each of these licenses. If a constraint changes, this change would need to be distributed to each license for each system that the content provider supports. This can be tedious and time consuming which may reduce the number of platforms the content provider is willing to support.

Embodiments of the present invention are directed at a uniform digital rights management (DRM) scheme that enables support for native DRM solutions implemented on various heterogeneous computing platforms. In embodiments, the unified DRM solution disclosed herein merges a unified DRM engine with the underlying native DRM engine of a platform. This may be accomplished without any mutual DRM protocol standardization between the unified DRM engine and the native DRM engine. On platforms that do not support the unified DRM engine for consumption of protected content, the unified DRM engine would utilize a first license associated with the unified DRM engine to protect a second license associated with the native DRM engine. The native DRM engine can utilize the second license to initialize the native DRM engine for consumption of protected content.

Platforms that support the unified DRM engine could include platforms where content consumption is not tightly coupled with the playback hardware. As used herein, platforms where content consumption is tightly coupled would include those platforms where the native DRM engine of the platform is implemented within the content playback hardware and/or firmware of the platform (e.g., video playback pipeline). Such platforms would include, for example, the above mentioned PlayStation 4, Xbox One, or the like. As such, in these platforms, the native DRM engine could be the only solution supported for content consumption because any content may need to pass through this native DRM engine prior to consumption. In contrast, a platform that supports a unified DRM engine could be a platform that is capable of supporting multiple DRM engines. Such a platform could be, for example, a personal computer.

The first license could define constraints in accordance with those defined by the content provider of the protected content, while the second license could define fewer, different, or no constraints at all. As such, the unified DRM engine protects the license for the native DRM engine rather than just protecting the content itself. In embodiments, this first license may be a unified content license, while the second license may be a native content license. The unified content license may be configured to protect the native content licenses for any number of native DRM engines with which the unified content license is to be utilized. Consequently, this solution enables a single unified DRM engine to support native DRM engines of multiple heterogeneous platforms.

As an example, the unified DRM engine could be ADOBE® Primetime DRM (available from Adobe Systems Inc. of San Jose, Calif.). The heterogeneous platforms could be, for example, SONY® PlayStation 4, MICROSOFT® Xbox One, and a personal computer (PC) utilizing a version of the Windows® operating system (available from Microsoft Corp. of Redmond, Wash.). The protected content could be, for example, digital video content. In such an example, the Primetime DRM would utilize a Primetime DRM license to protect a native license or native licenses associated with either, or both, of the previously mentioned PlayStation 4, or Xbox One. In contrast, the Primetime DRM would utilize the Primetime DRM license to protect the video content, rather than a native license, for the PC. In either case, this protection would be in accordance with constraints for consumption of the digital video content. In such an example, the native license could define no constraints at all. As such, the Primetime DRM would protect the native license that would be utilized by either of the above mentioned heterogeneous platforms to consume the digital video content rather than just protecting the video content itself.

Advantageously, in accordance with embodiments of the present invention, constraints may only need to be managed for a single license (e.g., the unified DRM license). As mentioned above, the native DRM licenses could, in some embodiments, contain no constraints at all. Also, advantageously, in accordance with embodiments of the present invention, a new platform may be added by merely incorporating a native DRM license for that new platform into the unified DRM license and possibly generating a version of the content for that new platform. This would enable protection of content for the new platform under the constraints of the unified DRM license without the need to designate constraints in the native DRM license. It will be appreciated that additional advantages may be apparent to those of ordinary skill in the art and that the above discussed advantages are merely meant to be illustrative in nature.

FIG. 1 depicts an illustrative computing environment 100 in accordance with various embodiments of the present invention. As depicted, computing environment 100 includes an example computing platform 102 coupled with an example unified digital rights management (DRM) license server 110, an example native DRM license server 120, and an example content server 122. Each of these servers may be coupled with computing platform 102 via any wired or wireless network, or any combination thereof. It will be appreciated that computing platform 102 and the depicted servers are merely meant to be illustrative in nature and that the composition of the items depicted in FIG. 1 and described below is selected for purposes of explanation and should not be treated as limiting of this disclosure.

Computing platform 102 includes content application 104, unified DRM engine 106, and native DRM engine 108. Computing platform 102 may represent, for example, a PlayStation 4, Xbox One, Nintendo Wii, etc. In embodiments, content application 104 is configured to receive a request from a user of computing platform 102 for protected content 126 from content server 122. Content application 104 can be any application capable of enabling the above mentioned request and may also be configured to consume the requested content. For example, content application 104 could be an internet browser, a video or music player, a document viewer, etc. As used herein, protected content refers to content protected by a DRM mechanism, which is generally accomplished by storing the content in an encrypted format and decrypting the content in response to validation of constraints that are applied to the content through a content license. Protected content 126 could be, for example, audio and/or visual content (e.g., movies, music, etc.), textual content (e.g., electronic book (e-book)), or any other type of content stored in a digital format.

In response, to the above mentioned request for protected content 126, content application 104 may be configured to determine that the requested content is protected by unified DRM engine 106. Such a determination can be accomplished utilizing initialization data received, for example, from content server 122. This initialization data can take any suitable form, such as, for example, a manifest or metadata associated with, or embedded in, the requested content. In embodiments, this initialization data may include an identifier of the DRM solution utilized to protect the requested content, which, in this instance, would identify unified DRM engine 106. Such an identifier may be, for example, a name of the DRM solution and/or version of the DRM solution, or any other suitable unique identifier. In response to determining that the requested content is protected by unified DRM engine 106, content application 104 can be configured to invoke unified DRM engine 106 to enable consumption of the protected content.

In some embodiments, content application 104 may also be configured to provide validation information to unified DRM engine 106. The validation information may be specified, for example, by the above mentioned initialization data. This validation information may include any information suitable for verifying constraints on the consumption of the requested content. These constraints may be specified by a provider of the requested content and may be defined in a license associated with the requested content. These constraints may include, for instance, limitations on who can consume the requested content, limitations on the geographic location where the requested content can be consumed, limitations on what devices may consume the requested content, etc. As such, the validation information could include, for example, user authentication information (e.g., user credentials), location information that identifies a current geographic location of computing platform 102, an identifier of computing platform 102 (e.g., internet protocol (IP) address or other unique identifier), any other information suitable for validating the various constraints. In other embodiments, unified DRM engine 106 may be configure to request the validation information from computing platform 102, rather than receiving it from content application 104. It will be appreciated that the above described constraints and validation information are merely meant to be illustrative of possible constraints and possible validation information and should not be interpreted as limiting of this disclosure. Any and all constraints and validation information with respect to consumption of content are contemplated.

In embodiments, unified DRM engine 106 is configured to retrieve a unified DRM license 114, associated with requested protected content 126, from unified DRM license server 110. Unified DRM license 114 would define constraints associated with consumption of the protected content, such as those discussed above. Unified DRM engine 106 can be configured to validate these constraints using the above discussed validation information.

If unified DRM engine 106 is unable to validate the constraints, or the constraints fail validation, then unified DRM engine 106 would not enable consumption of requested protected content 126 and instead would generally be configured to display an error to the user indicating that the validation was unsuccessful. If, however, unified DRM engine 106 is able to successfully validate the constraints, unified DRM engine 106 can be configured to determine whether unified DRM engine 106 provides native DRM support for computing platform 102. Such a determination may be made, for example, by retrieving a platform identifier of computing platform 102 and cross-referencing the platform identifier with a list of platforms supported by the unified DRM engine. A platform identifier may include a make, model, version, operating system, or any other suitable unique identifier, or combination thereof.

If unified DRM engine 106 does provide native DRM support for the computing platform, a content decryption element associated with unified DRM engine 106 can be extracted from unified DRM license 114. Hereinafter, such a content decryption element will be referred to as a unified content decryption element. The unified content decryption element may contain a content encryption key, or a reference to a content encryption key, and an algorithm identifier that identifies an algorithm that specifies how the encryption key is to be utilized to decrypt requested protected content 126. As used herein, a reference to a content encryption key would include any information for retrieving the content encryption key from another source. For example, the reference may identify a key server from which to acquire the content encryption key (e.g., via a uniform resource locator (URL), internet protocol (IP) address, etc.) an identifier of the content encryption key, and/or any credentials needed to acquire the content encryption key. In embodiments, this content encryption key is a symmetric key such that the content encryption key can be utilized for encryption and decryption. Unified DRM engine 106 would then be configured to decrypt the requested protected content 126 utilizing the content encryption key in accordance with the identified algorithm to enable consumption of requested protected content 126.

If, on the other hand, as depicted, unified DRM engine 106 does not provide native support for the platform, a content decryption element for native DRM engine 108 of computing platform 102 is retrieved. Hereinafter, such a content decryption element is referred to as a native content decryption element. In embodiments, the native content decryption element can be retrieved from unified DRM license 114 which may include native content decryption elements for a plurality of native DRM engines. As such, in some embodiments, to retrieve the content decryption element for the native DRM engine of computing platform 102, the unified DRM engine may first identify a native DRM engine associated with computing platform 102. This could be accomplished, for example, via a lookup table that cross-references computing platforms with associated native DRM engines. As discussed in further detail below, the native content encryption element may include a native license object, an identifier of an algorithm to be utilized in decrypting the content, and/or metadata containing information on the native DRM engine (e.g., a version of the native DRM engine for which the content decryption element is to be utilized).

Once the native content decryption element for computing platform 102 is retrieved, unified DRM engine 106 can be configured to extract a native license object from the native content decryption element. In some embodiments, unified DRM engine 106 may be configured to extract the native license object by decrypting the native license object utilizing the unified content decryption element, discussed above. As such, in embodiments, unified DRM engine 106 protects the native license object in a similar manner to how unified DRM engine 106 protects content. In embodiments, the native license object may be contained, for example, within a content encryption key section of the native content decryption element.

The native license object may be, for example, a license associated with the requested content to be utilized by the native DRM engine of the platform, or a reference to such a license. Hereinafter, such a license is referred to as a native DRM license. As used herein, a reference to a native DRM license would include any information for retrieving the native DRM license from another source. For example, the reference may identify a native DRM license server (e.g., native DRM license server 116) from which to acquire the native DRM license (e.g., via a uniform resource locator (URL), internet protocol (IP) address, etc.), an identifier of the native DRM license, an identifier of the requested protected content, and/or any credentials needed to acquire the native DRM license.

Unified DRM engine 106 may be further configured to utilize the native license object to set-up, or initialize, native DRM engine 108 for decryption of the requested protected content. This set-up may be accomplished through procedures specific to native DRM engine 108. Such procedures can be defined, for example, within the native content decryption element as metadata associated with the native DRM license or the native DRM engine. In embodiments, where the native license object is a reference to the native DRM license, the reference may enable the native DRM engine to dynamically retrieve the native DRM license from native DRM license server 116. In embodiments, where the native license object is the native DRM license, unified DRM engine 106 may pass the native DRM license to native DRM engine 108. This native DRM license may define fewer, different, or no constraints for consumption of the content as compared with the unified DRM license. In some embodiments, if there are constraints defined by the native DRM license, these constraints may be trivial in nature (e.g., a playback duration constraint that is equal to or greater than actual playback of the content). This is possible due to the previous validation of constraints by unified DRM engine 106. Because the constraints have already been validated, there may be no need for further validation of constraints. Consequently, management of constraints defined in the unified DRM license control consumption of requested protected content 126 even on computing platforms that are not configured to natively support unified DRM engine 106.

Native DRM engine 108 may be configured to decrypt the requested protected content in accordance with the native DRM license. In some embodiments, native DRM engine 108 may decrypt the content utilizing the same content encryption key contained in the unified content decryption element, discussed above. In such embodiments, the native content decryption element may identify a different algorithm than that identified in the unified content decryption element to be utilized by native DRM engine 108 to decrypt the content.

In other embodiments, native DRM engine 108 may decrypt the content utilizing a different content encryption key than that contained in the unified content decryption element, discussed above. In such embodiments, the native content decryption element may include the different content encryption key; an identifier of the different content encryption key that can be utilized to retrieve the different content encryption key (e.g., from a key server); or the native DRM license could include the different content encryption key, or a reference thereto. Regardless of where the different content encryption key is located, or included, the different content encryption key can be retrieved by the native DRM engine. For example, if the different content encryption key is included within the native DRM license, the native DRM engine may retrieve the different content encryption key from the native DRM license.

In addition, the native content decryption element may identify a different algorithm that specifies how the different content encryption key is to be utilized to decrypt the requested content. This different algorithm may be identified by an algorithm identifier contained within the native content decryption element.

In still other embodiments, two levels of encryption may be applied to the requested protected content. In such embodiments, unified DRM engine 106 may decrypt the content first to remove a first, or primary level of encryption, in a similar manner to that described above for embodiments where unified DRM engine 106 provides native support for the user's platform. After the primary level of encryption has been removed, native DRM engine 108 may decrypt the content second, in a similar manner to that described above, to remove a second, or secondary, level of encryption.

In some embodiments, once decrypted, the content may be provided back to content application 104 for consumption by a user via content application 104. In other embodiments, the decrypted content may instead be provided, by either unified DRM engine 106 or native DRM engine 108, directly to the user's platform (e.g., directly to the operating system of the platform, or an audio and/or video pipeline of the platform) for consumption by the user.

As depicted, Unified DRM license server 110 includes license generation module 112. License generation module 112 can be configured to generate unified DRM licenses (e.g., unified DRM license 114) by performing the process flow depicted in FIG. 3, below. Also as depicted, content server 122 includes content packaging module 124. Content packaging module 124 can be configured to generate instances of protected content (e.g., protected content 126) by performing the process flow depicted in FIG. 4, below.

It will be appreciated that the depiction in FIG. 1 of a single computing platform is merely for clarity of depiction and explanation. It is explicitly contemplated that additional computing platforms could also be included in computing environment 100. Such additional computing platforms could be different from computing platform 102, which comports with the heterogeneous nature of the above description. For example, if computing platform 102 is an Xbox One, then these additional computing platforms could include, for example, a PlayStation 4.

These additional computing platforms may include a unified DRM engine that is configured in a same, or similar, manner as unified DRM engine 106, discussed above. These additional computing platforms may, however, include native DRM engines that are different from native DRM engine 108 discussed above. As such, these additional computing platforms may be coupled with unified DRM server 110 and content server 122 in a similar manner to computing platform 102. However, these additional computing platforms may be respectively coupled with different native DRM license servers.

Figure 2:
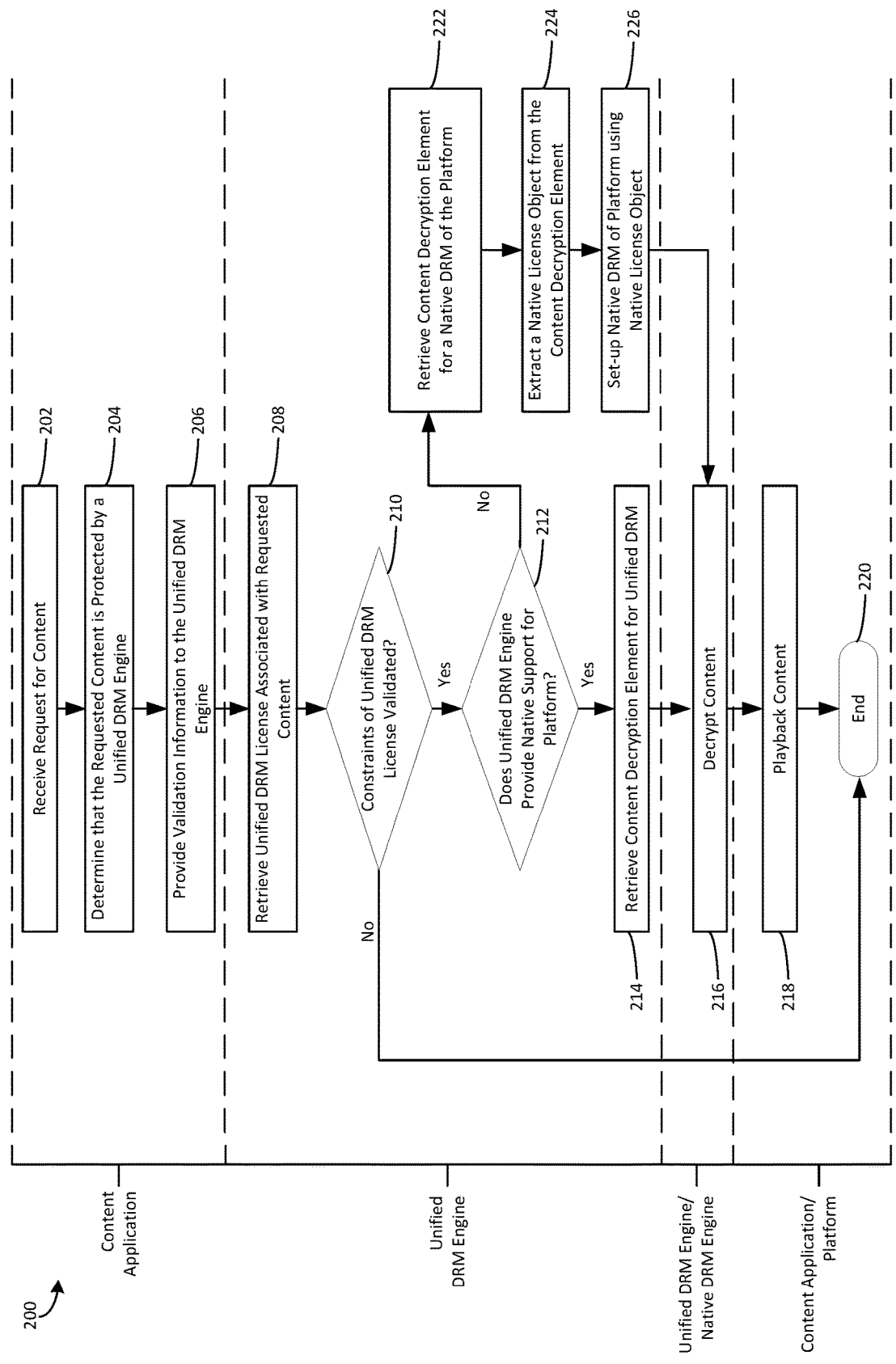
FIG. 2 is an illustrative flow diagram showing a method for consuming content in a unified digital rights management scheme in accordance with various embodiments of the present disclosure.

FIG. 2 depicts an illustrative process flow 200 showing a method for consuming content in a unified digital rights management scheme in accordance with various embodiments of the present disclosure. Process flow 200 may be carried out, for example, by a user's computing platform (e.g., computing platform 102 of FIG. 1). While the process flow is presented with delineations, represented by dashed lines, depicting example components that could carry out the delineated portions of process flow 200, it will be appreciated that this is merely meant to be illustrative of possible delineations and/or components and that any number of components could be utilized in carrying out process flow 200.

The depicted process flow begins at block 202 where a request for content is received by a content application (e.g., content application 104 of FIG. 1). In response, at block 204, the content application may make a determination that the requested content is protected by a unified DRM engine (e.g., unified DRM engine 106 of FIG. 1). This determination may be based, for example, on initialization data, such as that discussed above in reference to FIG. 1, received by the content application in response to an attempt to access the requested content.

At block 206 content application may optionally provide validation information to the unified DRM engine. The validation information may be specified, for example, by the above mentioned initialization data. This validation information may include any information suitable for verifying constraints on the consumption of the requested content. The validation information may include, for example, user authentication information (e.g., user credentials), location information that identifies a current geographic location of the user's computing platform, and/or an identifier of the user's computing platform (e.g., internet protocol (IP) address or other unique identifier). In other embodiments, the unified DRM engine may request the validation information from the user's computing platform. It will be appreciated that, in such embodiments, block 206 may be omitted from the process flow.

At block 208 the unified DRM engine retrieves a unified DRM license (e.g., unified DRM license 500 of FIG. 5) associated with the requested content from a unified DRM license server (e.g., unified DRM license server 110). At block 210, the unified DRM engine validates constraints on consumption of the requested content that are defined within the unified DRM license. In some embodiments, the above discussed validation information may be retrieved by the unified DRM engine at this point in the process flow in order to accomplish the validation of the constraints defined within the unified DRM license.

If the constraints are not validated, or fail validation, then the process flow would proceed to block 220 where the process flow would end, thus preventing consumption of the requested content. If, however, the constraints are validated, the process flow would proceed to block 212 where a determination may be made as to whether the unified DRM engine provides native support for the user's platform. Such a determination may be made, for example, by retrieving a platform identifier of the user's computing platform and cross-referencing the platform identifier with a list of platforms supported by the unified DRM engine. A platform identifier may include a make, model, version, operating system, or any other suitable unique identifier, or combination thereof.

If the unified DRM engine does provide native support for the user's computing platform, then the process flow may proceed to block 214 where a content decryption element for the unified DRM engine is retrieved from the unified DRM license. Hereinafter, such a content decryption element will be referred to as a unified content decryption element. The unified content decryption element may contain a content encryption key, or a reference to a content encryption key, and an algorithm identifier that identifies an algorithm that specifies how the encryption key is to be utilized to decrypt the requested content. In embodiments, this encryption key is a symmetric encryption key. At block 216, the unified DRM engine would then decrypt the content utilizing the content encryption key in accordance with the identified algorithm.

If, on the other hand, the unified DRM engine does not provide native support for the user's computing platform, the process may proceed from block 212 to block 222. At block 222, a content decryption element for the native DRM engine of the user's computing platform is retrieved. Hereinafter, such a content decryption element is referred to as a native content decryption element. In embodiments, the native content decryption element can be retrieved from the unified DRM license which may include native content decryption elements for a plurality of native DRM engines. As such, in some embodiments, to retrieve the content decryption element for the native DRM of the user's computing platform, the unified DRM engine may first identify a native DRM engine associated with the user's computing platform. This could be accomplished, for example, via a lookup table that cross-references platforms with their associated native DRM engines. The unified DRM engine would then retrieve the native content decryption element for the identified native DRM engine.

Once the native content decryption element for the user's computing platform is retrieved, at block 224, a native license object may be extracted by the unified DRM engine from the native content decryption element. The native license object may be, for example, a license associated with the requested content to be utilized by the native DRM engine of the user's computing platform, or a reference to such a license. Hereinafter, such a license is referred to as a native DRM license. In some embodiments, the native license object may be extracted by decrypting the native license object utilizing the content decryption element for the unified DRM engine, discussed above. As such, the unified DRM engine, in embodiments, protects the native license object in a similar manner to how the unified DRM engine protects content.

At block 226, the native license object may be utilized by the unified DRM engine to set-up, or initialize, the native DRM engine for decryption of the data. This set-up may be accomplished through procedures specific to the native DRM engine. Such procedures can be defined, for example, within the native content decryption element as metadata associated with the native DRM license. In embodiments, where the native license object is a reference to the native DRM license, the reference may enable the native DRM engine to dynamically retrieve the native DRM license. In embodiments, where the native license object is the native DRM license, the unified DRM engine may pass the native DRM license to the native DRM engine. As mentioned previously, this native DRM license may define fewer, different, or no constraints for consumption of the content. In some embodiments, if there are constraints defined by the native DRM license, these constraints may be trivial in nature (e.g., a playback duration constraint that is equal to or greater than actual playback of the content). This is possible due to the previous validation of constraints at block 210 performed by the unified DRM engine.

At block 216 the content is decrypted by the native DRM engine where the unified DRM engine does not provide native support for the user's platform. In some embodiments, the native DRM engine may decrypt the content utilizing the same content encryption key contained in the unified content decryption element, discussed above. In such embodiments, the native content decryption element may identify a different algorithm than that identified in the unified content decryption element to be utilized by the native DRM engine to decrypt the content. This different algorithm may be identified by an algorithm identifier contained within the native content decryption element.

In other embodiments, the native DRM engine may decrypt the content utilizing a different content encryption key than that contained in the unified content decryption element, discussed above. In such embodiments, the native content decryption element may include the different content encryption key; an identifier of the different content encryption key that can be utilized to retrieve the different content encryption key (e.g., from a key server); or the native DRM license could include the different content encryption key, or a reference thereto. Regardless of where the different content encryption key is located, or included, the different content encryption key can be retrieved by the native DRM engine. For example, if the different content encryption key is included within the native DRM license, the native DRM engine may retrieve the different content encryption key from the native DRM license.

In addition, the native content decryption element may identify a different algorithm that specifies how the different content encryption key is to be utilized to decrypt the requested content. This different algorithm may be identified by an algorithm identifier contained within the native content decryption element.

In still other embodiments, two levels of encryption may be applied to the requested content. In such embodiments, the unified DRM engine may decrypt the content first to remove the first, or primary level of encryption, as described above for embodiments where the unified DRM engine provides native support for the user's platform. After the primary level of encryption has been removed, the native DRM engine may decrypt the content second, in a similar manner to that described above, to remove the second, or secondary, level of encryption.

In some embodiments, once decrypted, the content may be provided back to the content application for consumption by the user via the content application. In other embodiments, the unified DRM engine may instead provide the decrypted content directly to the user's platform (e.g., directly to the operating system of the platform, or an audio and/or video pipeline of the platform) for consumption by the user. This consumption would occur at block 218, where, as depicted in this embodiment, the content is played back.

Figure 3:
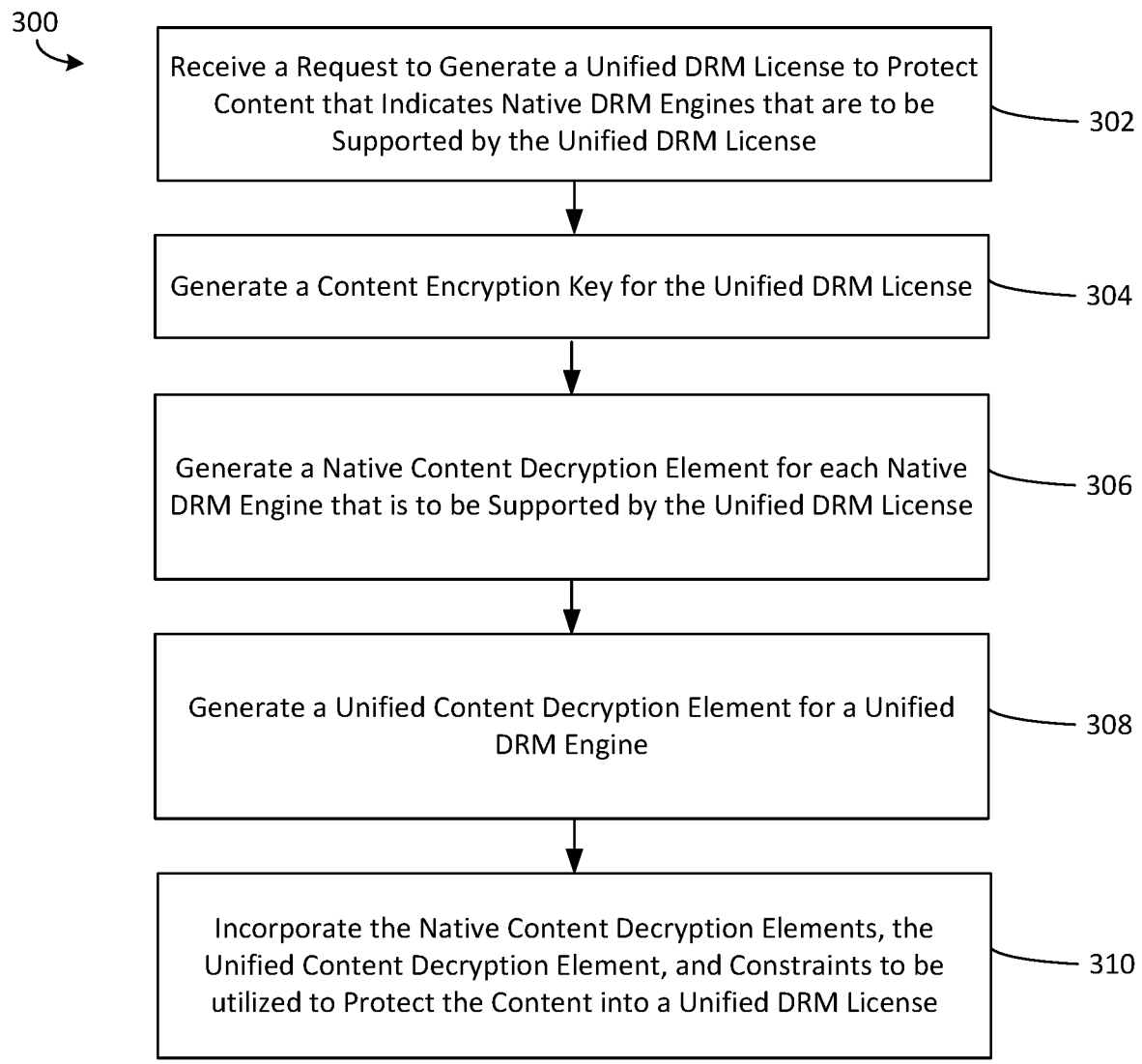
FIG. 3 is an illustrative flow diagram showing a method of license generation for a unified digital rights management scheme in accordance with various embodiments of the present disclosure.

FIG. 3 depicts an illustrative process flow 300 showing a method of license generation for a unified digital rights management scheme in accordance with various embodiments of the present disclosure. Process flow 300 may be carried out, for example, by license generation module 112 of FIG. 1. The process may begin at block 302 where a request to generate a unified DRM license (e.g., unified DRM license 502 of FIG. 5) is received. In embodiments this request can identify the content that the unified DRM license is to protect, constraints associated with consumption of the content to be applied by the unified DRM license, and/or one or more native DRM engines that are to be supported by the unified DRM license.

At block 304, a content encryption key is generated. This content encryption key may be a symmetric encryption key. The content encryption key can be utilized to encrypt the content identified in the request during a packaging process, such as that depicted in FIG. 4 below. In addition the content encryption key can be utilized to decrypt the content, once the content is encrypted, to enable consumption of the content as discussed above in reference to FIGS. 1 and 2. In addition, in some embodiments, the content encryption key can be utilized to encrypt or decrypt the native content decryption elements discussed below.

Once the content encryption key has been generated, process flow 300 proceeds to block 306 where a native content decryption element is generated for each native DRM engine that is to be supported by the unified DRM license. In embodiments, these native content decryption elements could each include a native license object. The native license object of a native content decryption element may be, or include, a native DRM license, or a reference to such a license, for a respective native DRM engine. The native DRM license, or the reference to such a license, may be utilized by a unified DRM engine to initialize the respective native DRM engine. In addition, the native DRM license may define fewer, different, or no constraints with respect to consumption of the data than those included in the request.

In addition, these native content decryption elements could include metadata associated with the respective native DRM engine and/or the respective native license object. Such metadata may include the procedures that a unified DRM engine would carry out to initialize the respective native DRM engine; an identifier and/or version of the respective native DRM engine; a content encryption key for the respective native DRM engine, or a reference to such a key; an algorithm identifier that identifies an algorithm to be utilized in conjunction with the key to encrypt and/or decrypt the content identified in the request; any other suitable information; or any combination thereof.

In some embodiments, generating the native content encryption elements may include encryption of the contents of the native content encryption elements. This may be accomplished, for example, utilizing the content encryption key generated at block 304.

At block 308 a unified content decryption element for a corresponding unified DRM engine, such as that discussed elsewhere herein, is generated. This unified content decryption element may include the content encryption key for the unified DRM engine generated at block 304, or a reference to this content encryption key; an algorithm identifier that identifies an algorithm to be utilized in conjunction with the content encryption key for encryption or decryption of content and/or the above discussed native content decryption elements.

Process flow 300 then proceeds to block 310 where the resulting unified DRM license is generated. As depicted, this is accomplished by incorporating the native content decryption elements generated at block 306 into the unified DRM license. The unified content decryption element generated at block 308 is also incorporated into the unified DRM license. In addition, the constraints associated with consumption of the content could also be incorporated into the unified DRM license.

In addition to generating the unified DRM license, this process may produce metadata associated with the unified DRM license. This metadata may include an identifier of the content to which the unified DRM license is associated and/or the content encryption key for the unified DRM license, in embodiments where the content encryption key for the unified DRM license is not included in the unified content decryption element. This metadata may be utilized, for example, to identify the correct unified DRM license to be employed for content.

Figure 4:
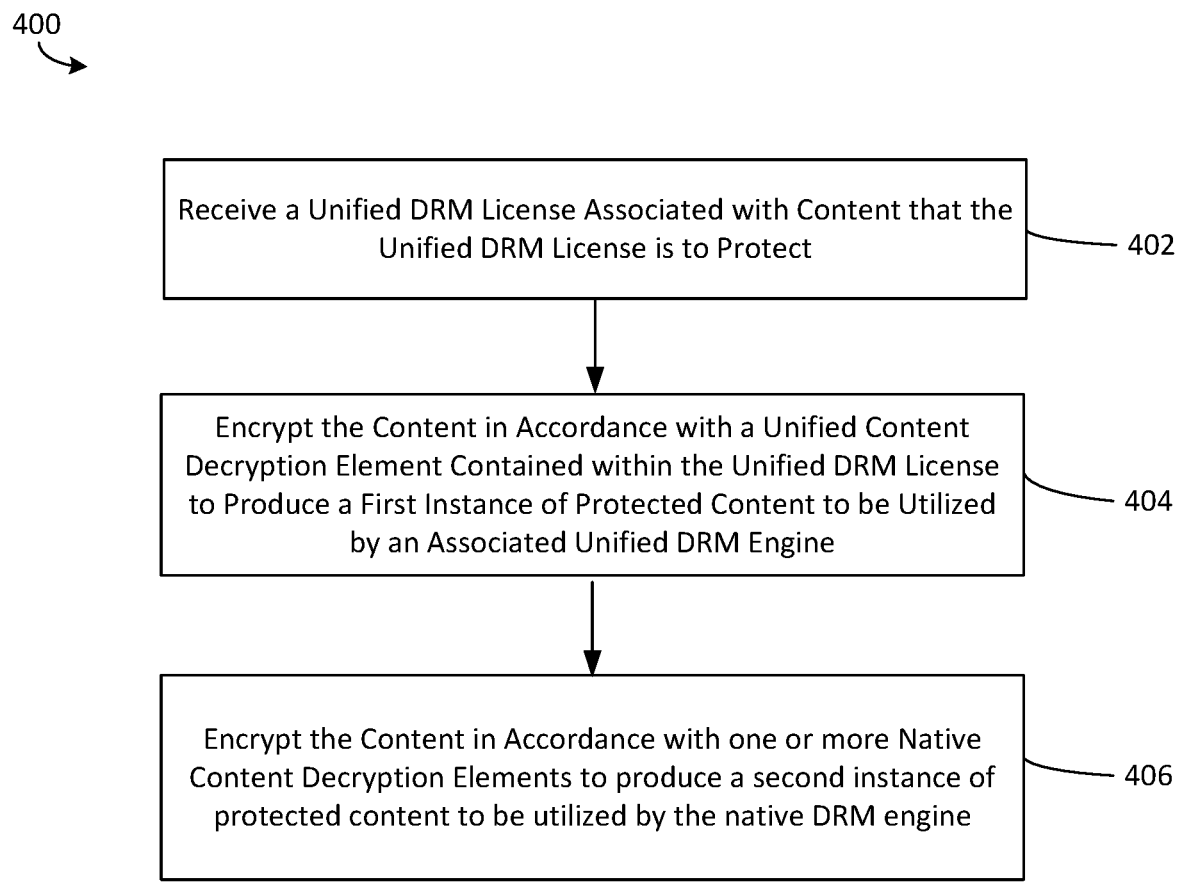
FIG. 4 is an illustrative flow diagram showing a method of packaging content for a unified digital rights management scheme in accordance with various embodiments of the present disclosure.

FIG. 4 depicts an illustrative process flow 400 showing a method of packaging content for a unified digital rights management scheme in accordance with various embodiments of the present disclosure. Process flow 400 may be carried out, for example, by content packaging module 124 of FIG. 1.

The process may begin at block 402 where a unified DRM license is received. The unified DRM license could be similar to that depicted by unified DRM license 500 of FIG. 5 and/or that generated by process flow 300 of FIG. 3. The unified DRM license could include a unified content decryption element associated with a unified DRM engine and one or more native content decryption elements respectively associated with one or more native DRM engines. In addition to the unified DRM license, in some embodiments, metadata associated with the unified DRM license may be received. This metadata could include, for example, an identifier of content that the unified DRM license is to protect.

At block 404, the content to be protected by the unified DRM license is encrypted in accordance with the unified content decryption element to produce a first instance of protected content. This may be accomplished utilizing a content encryption key, either included or referenced in the unified content decryption element, in conjunction with an algorithm identified in the content decryption element that specifies how the content encryption key is to be utilized to encrypt the requested content. This encrypted content can be persisted on a content server, such as, for example, content server 122 of FIG. 1.

At block 406, the content is encrypted in accordance with each of the one or more native content decryption elements to produce respective instances of protected content to be utilized by respective native DRM engines. This may be accomplished utilizing a content encryption key, either included or referenced by a native content decryption element, and an algorithm identified in the native content decryption element that specifies how the content encryption key is to be utilized to encrypt the requested content.

In some instances, the content encryption key included or referenced by a native content decryption element is the same as that included or referenced in the unified content decryption element. In such instances, the algorithm identified in the native content decryption element may be different from the algorithm identified in the unified content decryption element such that, although the content encryption keys may be the same, the resulting encryption may be different.

In other instances, the content encryption key included or referenced by a native content decryption element is different from that included or referenced in the unified content decryption element. In such instances, the content encryption key included or referenced by the native content decryption element may be selected, or generated, based on requirements for the native DRM engine with which the native content decryption element is associated.

In some embodiments, the content may be encrypted in accordance with both the unified content decryption element and each of the native content decryption elements. In such embodiments, the content encryption key included or referenced in the unified content decryption element may be utilized as a primary content encryption key. The content encryption key included or referenced in the native content decryption element may be utilized as a secondary content encryption key.

The result of process flow 400 is instances of encrypted content for each native DRM engine supported by the unified DRM engine. These instances of encrypted content can be persisted on a content server, such as, for example, content server 122 of FIG. 1.

Figure 5:
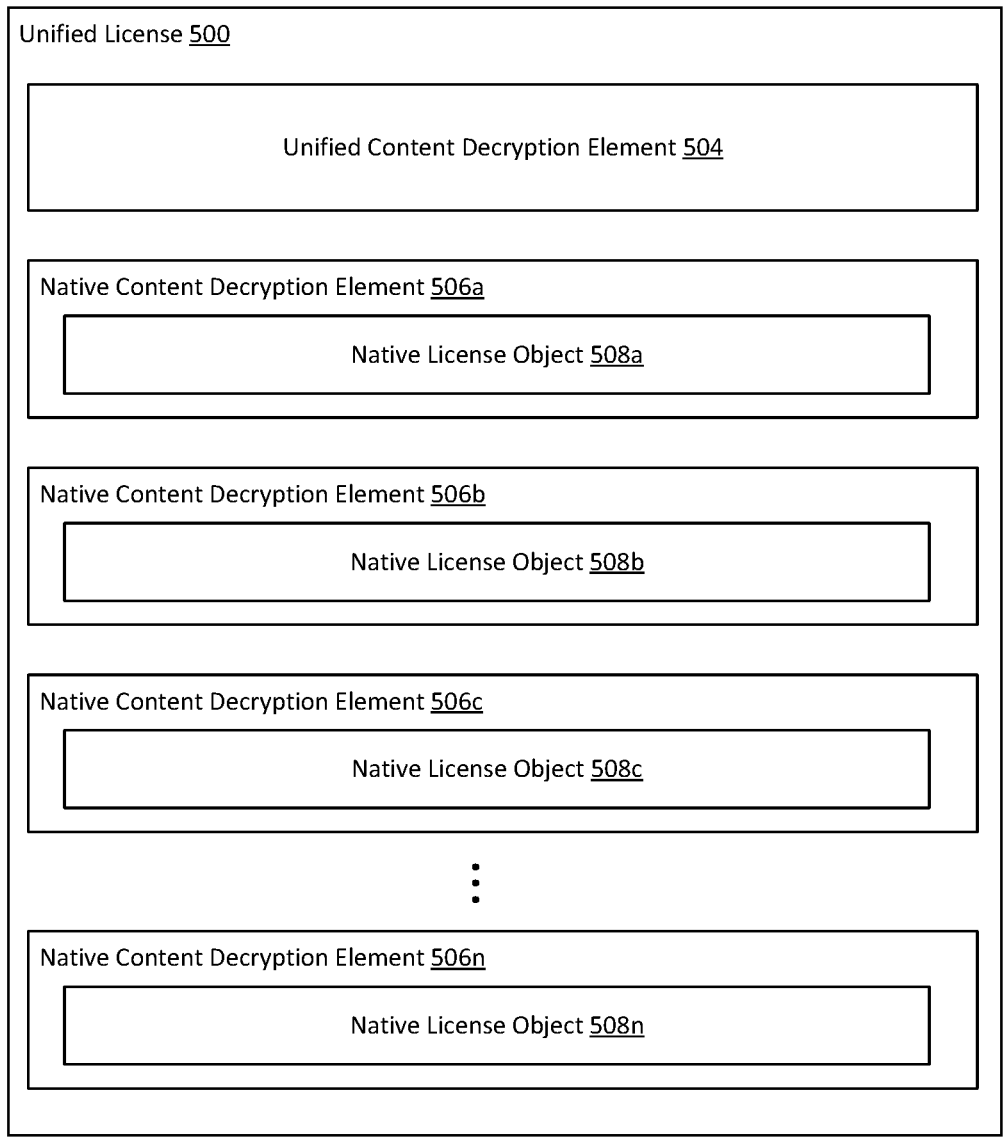
FIG. 5 is an illustrative depiction of a license for a unified digital rights management scheme in accordance with various embodiments of the present disclosure.

FIG. 5 is an illustrative depiction of a license for a unified digital rights management scheme in accordance with various embodiments of the present disclosure. As can be seen, unified DRM license 500 includes a unified content decryption element 504 and native DRM content encryption elements 506a-506n.

Unified content decryption element 504 may include a content encryption key for the unified DRM engine, or a reference to such a content encryption key; an algorithm identifier that identifies an algorithm to be utilized in conjunction with the content encryption key for encryption or decryption of content and/or encryption or decryption of native content decryption elements 506a-506n.

Each of native content decryption elements 506a-506n can be associated with a respective native DRM engine supported by the unified DRM license. In embodiments, native content decryption elements could each include a respective native license object 508a-508n. The native license object of a native content decryption element may be, or include, a native DRM license, or a reference to such a license, for a respective native DRM engine. The native DRM license, or the reference to such a license, may be utilized by a unified DRM engine to initialize the respective native DRM engine. In addition, the native DRM license may define fewer, different, or no constraints with respect to consumption of the data than those included in the request.

Figure 6:
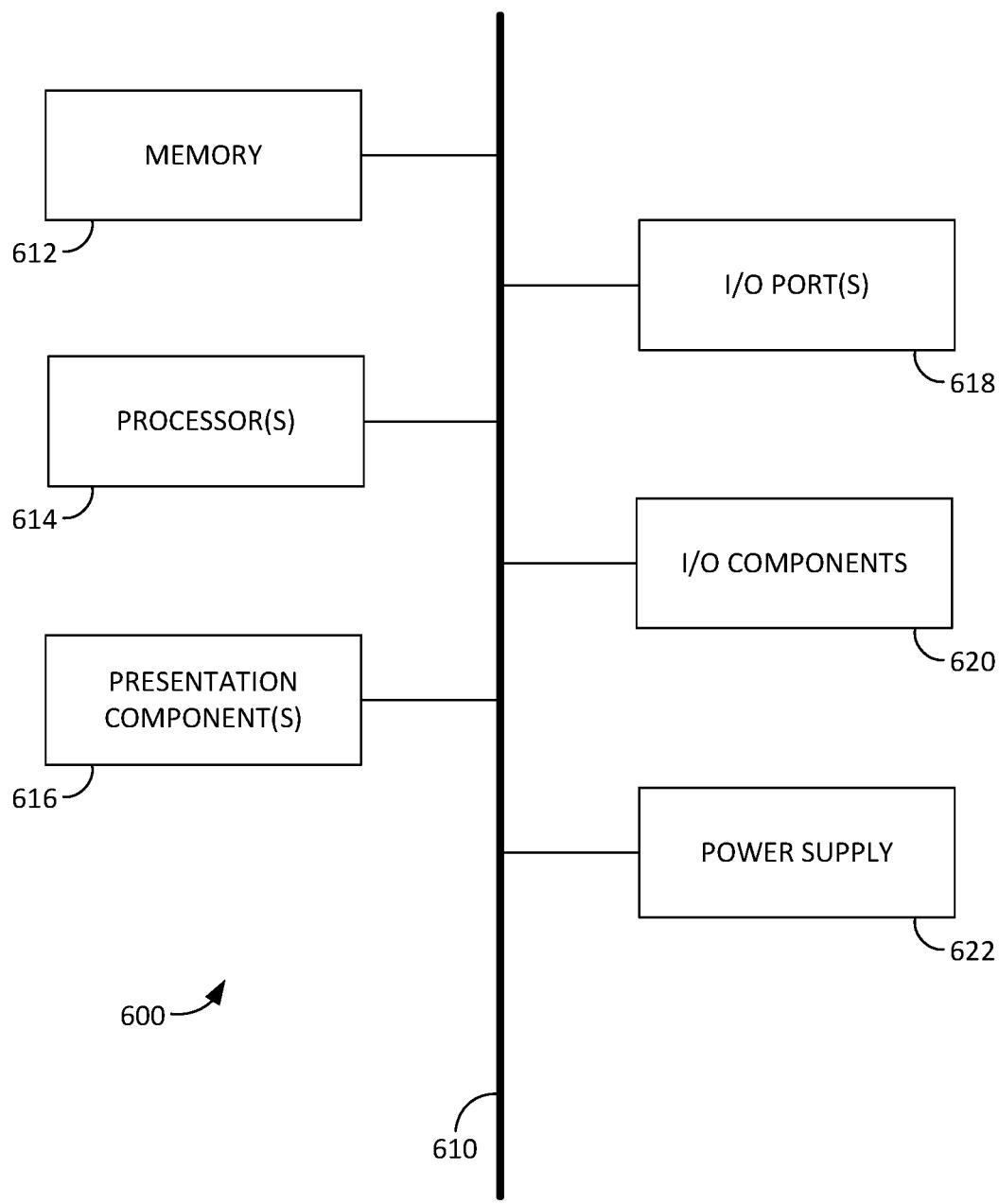
FIG. 6 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 6, an illustrative operating environment, or computing platform, for implementing embodiments of the present invention is shown and designated generally as computing device 700. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although depicted in FIG. 6, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 616 while also being one of the I/O components 620. As another example, processors have memory integrated therewith in the form of cache; however, there is no overlap between the one or more processors 614 and the memory 612. A person having of skill in the art will readily recognize that such is the nature of the art, and it is reiterated that the diagram of FIG. 6 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 600 of FIG. 6 and any other reference to "computing device," unless the context clearly indicates otherwise.

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 600 includes one or more processors 614 that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a stylus, such as that discussed elsewhere herein, a drawing tablet, such as that discussed elsewhere herein, a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to one or software modules or applications that may cause the display of the computing device 600 to render immersive augmented reality or virtual reality.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for providing unified digital rights management (DRM) services to a first computing platform, which, when executed by a processor device cause performance of actions comprising:
   in response to receiving a request for content, performing a validation of a second license for the content, wherein the second license is associated with a second computing platform that is separate from the first computing platform; and
   in response to a successful validation of the second license, enabling a native DRM engine to generate a non-encrypted version of the content based on an encrypted version of the content and a first license for the content, wherein the native DRM engine is native to the first computing platform and the first license is associated with the first computing platform.

2. The computer-readable storage medium of claim 1, wherein the actions further comprise:
identifying a content decryption element from a plurality of content decryption elements respectively associated with a plurality of other DRM engines that are native to a plurality of other computing platforms, wherein the content decryption element contains a native license object; and
employing the native license object to enable the native DRM engine to decrypt the encrypted version of the content, wherein the native license object includes at least one of the second license or a reference to the second license.

3. The computer-readable storage medium of claim 1, wherein the actions further comprise:
employing a content decryption element to enable the native DRM engine to decrypt the encrypted version of the content, wherein the content decryption element is identified from a plurality of content decryption elements included in the first license.

4. The computer-readable storage medium of claim 1, wherein the actions further comprise:
obtaining one of the second license or a reference to the second license by decrypting a native license object that is encrypted in an identified decryption element.

5. The computer-readable storage medium of claim 1, wherein the first license defines a first number of constraints on a consumption of the content, the second license defines a second number of constraints on the consumption of the content, and the first number is less than the second number.

6. The computer-readable storage medium of claim 1, wherein the first license defines a first plurality of constraints that includes a first constraint on a consumption of the content, the second license defines a second plurality of constraints that includes a second constraint on the consumption of the content, the first constraint is excluded from the second plurality of constraints, and the second constraint is excluded from the first plurality of constraints.

7. The computer-readable storage medium of claim 1, wherein the first license lacks a definition of constraints on a consumption of the content.

8. The computer-readable storage medium of claim 1, wherein the actions further comprise:
receiving, from a user of the first computing platform, a request for a consumption of the content;
generating the non-encrypted version of the content in response to the received request for the consumption of the content; and
providing the non-encrypted version of the content to the user.

9. The computer-readable storage medium of claim 1, wherein the actions further comprise:
in response to determining that a unified DRM engine of the first computing platform is unsupported for generating a non-encrypted version of the content, enabling the native DRM engine to generate the non-encrypted version of the content.

10. The computer-readable storage medium of claim 1, wherein the first license is a native DRM license and the second license is a unified DRM license.

11. A method for providing digital rights management (DRM) services to a first computing platform, the method comprising:
in response to receiving a request for content, performing a validation of a second license for the content, wherein the second license is associated with a second computing platform that is separate from the first computing platform; and
in response to a successful validation of the second license, enabling a native DRM engine to generate a non-encrypted version of the content based on an encrypted version of the content and a first license for the content, wherein the native DRM engine is native to the first computing platform and the first license is associated with the first computing platform.

12. The method of claim 11, further comprising:
identifying a content decryption element from a plurality of content decryption elements respectively associated with a plurality of other DRM engines that are native to a plurality of other computing platforms, wherein the content decryption element contains a native license object; and
employing the native license object to enable the native DRM engine to decrypt the encrypted-version of the content, wherein the native license object includes at least one of the second license or a reference to the second license.

13. The method of claim 11, further comprising:
employing a content decryption element to enable the native DRM engine to decrypt the encrypted-version of the content, wherein the content decryption element is identified from a plurality of content decryption elements included in the first license.

14. The method of claim 11, further comprising:
obtaining one of the second license or a reference to the second license by decrypting a native license object that is encrypted in an identified decryption element.

15. The method of claim 11, wherein the first license defines a first number of constraints on a consumption of the content, the second license defines a second number of constraints on the consumption of the content, and the first number is less than the second number.

16. A digital rights management (DRM) system for providing unified DRM services, comprising:
a processor device; and
a computer-readable storage medium, coupled with the processor device, having instructions stored thereon, which, when executed by the processor device, perform actions comprising:
in response to receiving a request for content, performing a validation of a second license for the content, wherein the second license is associated with a second computing platform that is separate from a first computing platform; and
in response to a successful validation of the second license, enabling a native DRM engine to generate a non-encrypted version of the content based on an encrypted version of the content and a first license for the content, wherein the native DRM engine is native to the first computing platform and the first license is associated with the first computing platform.

17. The unified DRM system of claim 16, wherein the first license defines a first plurality of constraints that includes a first constraint on a consumption of the content, the second license defines a second plurality of constraints that includes a second constraint on the consumption of the content, the first constraint is excluded from the second plurality of constraints, and the second constraint is excluded from the first plurality of constraints.

18. The unified DRM system of claim 16, wherein the actions further comprise:
   receiving, from a user of the first computing platform, a request for a consumption of the content;
   generating the non-encrypted version of the content in response to the received request for the consumption of the content; and
   providing the non-encrypted version of the content to the user.

19. The unified DRM system of claim 16, wherein the actions further comprise:
   in response to determining that a unified DRM engine of the first computing platform is unsupported for generating a non-encrypted version of the content, enabling the native DRM engine to generate the non-encrypted version of the content.

20. The unified DRM system of claim 16, wherein the first license is a native DRM license and the second license is a unified DRM license.

\* \* \* \* \*

UNITED STATES PATENT AND TRADEMARK OFFICE
CERTIFICATE OF CORRECTION

PATENT NO. : 10,956,540 B2
APPLICATION NO. : 16/130932
DATED : March 23, 2021
INVENTOR(S) : Aldrin Chella Daniel et al.

Page 1 of 1

It is certified that error appears in the above-identified patent and that said Letters Patent is hereby corrected as shown below:

On the Title Page

Item (63), Related U.S. Application Data, Line 2, delete "Jun. 7, 2015," and insert -- Jun. 17, 2015, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*